United States Patent [19]

Francini et al.

[11] 3,724,652

[45] Apr. 3, 1973

[54] TWIN DISC PACK

[75] Inventors: Joseph P. Francini, Castro Valley; Michael A. Verdone, Hillsborough, both of Calif.

[73] Assignee: The Singer Company, New York, N.Y.

[22] Filed: June 14, 1971

[21] Appl. No.: 152,796

[52] U.S. Cl......206/62 P, 179/100.2 Z, 340/174.1 C, 346/137

[51] Int. Cl...............................................G11b 1/02

[58] Field of Search.....200/62 P, 52 R; 340/174.1 C; 346/137; 179/100.2 F

[56] References Cited

UNITED STATES PATENTS

| | | | |
|---|---|---|---|
| 3,570,661 | 3/1971 | Kersh | 340/174.1 C |
| 3,509,992 | 5/1970 | David et al | 340/174.1 C |
| 3,566,381 | 2/1971 | Buslik et al. | 340/174.1 C |

*Primary Examiner*—Vincent P. Canney
*Attorney*—Warren P. Kujawa et al.

[57] ABSTRACT

A twin disk pack assembly comprising a first or lower disc pack and a second or upper disk pack. Each disk pack has a number of stacked discs coaxially mounted on a hub in spaced apart relation. Each of the discs has a magnetic recording surface for storing information. The lower disk pack is first placed on the spindle and then the upper disk pack is placed on the spindle and secured thereto. The lower disc pack is provided with a fixed drive pin that is adapted to be inserted into a hole located in the hub of the upper disk pack. Visible indexing symbols are placed on the surface of the uppermost disc of each disk pack to facilitate the engagement of the drive pin in its mating hole. In addition, stabilizer pins are provided to preventing tipping of the upper disc pack before the drive pin has been engaged.

35 Claims, 5 Drawing Figures

INVENTOR.
Michael A. Verdone
Joseph P. Francini

BY

TWIN DISC PACK

BACKGROUND OF THE INVENTION

This invention relates to disc pack memories and more specifically to a twin disc pack assembly.

Advances in semi-conductor technology and computer design have made available an increased number of reasonably priced small scale computers. These small scale computers known as mini or midi computers are generally used for solving single or a specialized group of tasks. The advent of these small scale computers fostered the need for memory devices similarly scaled in performance and price.

One type of memory device utilized with the mini computer is a flat circular disc resembling a phonograph record. The disc is coated on one or both sides with a magnetic recording material. The disc is rotated by means of a motor-driven spindle. Data is stored and retrieved by the use of magnetic heads positioned above the disc surfaces. Most of the heads used today are of the flying type, where air carried along by the spinning disc acts as a bearing upon which the head rides. The heads can be fixed or movable. When a movable head disc drive is utilized, a disc can be removed from its spindle and another disc placed on the spindle.

These single disc devices have been expanded to multidisc assemblies known as disc packs. Disc packs customarily have a number of stacked discs coaxially mounted on a hub in spaced apart relation. The disc pack is fitted and locked onto a spindle. Each pack normally has a bottom sector disc with a number of equally spaced peripheral notches. When the discs are rotated, the sector disc notches provide accurate positioning information so that information may be read into and extracted from the proper locations. The disc packs are removably attached to the spindle so that different disc packs can be used with the same disc drive. These disc pack assemblies provide excellent data file systems. In order to protect the discs of the disc pack when the disc is not in use, dust covers designed to be removed as the disc pack is secured to the spindle are generally used with these devices.

The existing disc pack assemblies known to the Applicant provide the use of but one removable disc pack at a given time. One such system utilizing a single removable disc pack mounted on a tapered spindle is disclosed in U.S. Pat. No. 3,176,281. In addition to the single removable disc pack assemblies disclosed in the above referenced U.S. patent, hybrid systems utilizing a single fixed disc in conjunction with a removable disc pack are also available on the market. However, both of these existing systems are limited to the use of a single removable disc pack.

SUMMARY OF THE INVENTION

This invention provides a disc pack assembly having two removable disc packs mounted on a single tapered spindle. The two or twin disc packs are mounted one above the other on the spindle. Each disc pack has a plurality of stacked discs coaxially mounted on a hub in spaced apart relation. The inner surface of the hub of the lower disc is tapered to fit onto a standard spindle such as that disclosed in the above-referenced U.S. patent. Two slightly different embodiments of the construction of the upper disc pack hub are disclosed. However, in both embodiments the hub is configured to be fitted onto the spindle and a standard mechanism for locking the upper disc pack to the spindle is provided with both embodiments of the upper disc pack. Only the upper disc pack is provided with this standard mechanism. Although not shown and therefore not forming a part of this invention, both the upper and the lower disc packs would normally be provided with dust covers.

The lower disc pack which is provided with a fixed drive pin is first placed on the spindle. The upper disc pack, the hub of which is provided with a hole for mating with the drive pin of the lower disc pack, is then placed on the spindle and locked onto the spindle when the pin and the hole are mated. To facilitate the engagement of the drive pin in its mating hole when the upper disc pack is fitted onto the lower disc pack, a visible indexing symbol is placed on the surface of the uppermost disc of each pack. In addition, two or more spring mounted stabilizer pins are provided to prevent tipping of the upper disc pack before the drive pin has been engaged in its mating hole. As has been mentioned above, disc packs utilize sector disc notches to provide accurate positioning information. With the twin disc pack of this invention, only the lowermost disc of the lower disc pack need be provided with these notches since both packs rotate synchronously when properly mounted on the spindle.

The twin disc pack assembly of this invention provides a degree of flexibility hithertofore unavailable with the single removable disc pack systems. Normally, the user of this invention would need only one lower disc pack and one or more upper disc packs. The file data is stored on the individual upper disc packs. In such a system, data processing of the file data is accomplished by first transferring the data from the upper set to the lower set and thence to the computer where it is processed. The newly processed data is then transferred back from the computer to the lower disc pack and finally to the upper disc pack where it is stored for further useage. However, this invention is not limited to the type of useage just described. For example, data common to a plurality of tasks can be stored on the lower disc pack and this data is then utilized with a specific upper disc pack to perform a particular task. In other words a plurality of upper disc packs containing specific different data are utilized one at a time with the common data stored on the lower disc pack. Of course, different complete sets of upper and lower disc packs can be utilized and different lower disc packs could be utilized with a specific upper disc pack. All this points to the fact that this invention provides the user with a highly versatile memory system.

It is therefore an object of this invention to provide a memory device.

It is another object of this invention to provide a twin disc pack assembly.

It is still another object of this invention to provide a disc drive assembly having two disc packs removably mounted on a common spindle.

It is a further object of this invention to provide means to properly align two disc packs on a common spindle.

It is still a further object of this invention to provide means to prevent the tipping of the upper disc pack when the upper disc pack is initially placed on the spindle.

It is yet a further object of this invention to provide a twin disc pack assembly in which means are provided for engaging the hubs of the twin disc packs so that both disc packs can be driven from a common spindle.

BRIEF DESCRIPTION OF THE DRAWING

The above mentioned and other objects of the invention will become readily apparent from the following detailed description when read in conjunction with the annexed drawing in which like parts have like number and in which.

DETAILED DESCRIPTION OF THE INVENTION

Figure 1:
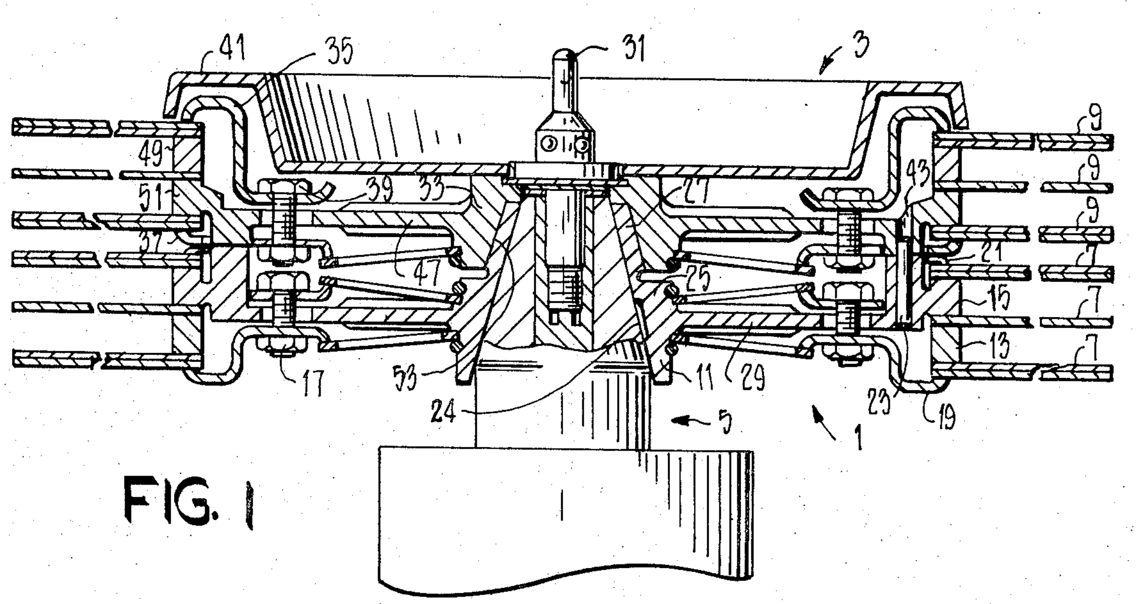
FIG. 1 shows a first embodiment of the twin disc pack assembly of this invention.

FIG. 1 shows in cross section a first embodiment of the twin disc pack assembly of this invention. As shown in FIG. 1, the assembly comprises a first or lower disc pack 1 and a second or upper disc pack 3. Lower disc pack 1 and upper disc pack 3 are both mounted on a tapered spindle 5. Upper disc pack 3 is secured to spindle 5 by securing means 31. Securing means 31 may be any suitable means such as a bolt mated with a threaded hole in the center of the spindle. The spindle arrangement shown in FIG. 1 is similar to the spindle arrangement disclosed in above referenced U.S. Pat. No. 3,176,281. However, this invention is not limited to the specific spindle construction disclosed in the said U.S. patent. Any similar spindle arrangement could be utilized. In any event the particular spindle arrangement used is not critical to this invention. Therefore, a detailed description of the spindle construction is not given herein.

Disc packs 1 and 3 are mounted on the spindle 5 in the following manner: securing means 31 is removed from the spindle and disc pack 1 is slipped onto to the spindle. Disc pack 3 is then slipped onto the spindle and in the embodiment of FIG. 1 over the hub of disc pack 1. Fastening means 31 is then threaded into spindle 5. As will be apparent later disc packs 1 and 3 must be properly aligned before disc pack 3 is secured to spindle 5.

Lower disc pack 1 has a plurality of discs 7 secured to a hub 11. Discs 7 have a magnetic coating on one or both of their surfaces. Hub 11 has an inner conical surface 23 and the irregular shaped outer surface 25 and a leg or spoke 29 that extends outward from surface 25 and ends at 15. Portion 15 of spoke 29 forms a spacer for holding the uppermost and middle discs 7 apart from each other. The lowermost discs 7 and middle discs 7 are spaced apart by means of a spacer 13. Discs 7 are clamped in place by means of the clamps 19 and 21 that are joined together at their other end by means of a nut and bolt 17 as shown in FIG. 1. A drive pin 23 is secured in spoke 29. This drive pin extends above the top surface of uppermost disc 7.

The actual manner in which the discs are fastened and secured to hub 11 is not critical to this invention. Any suitable construction techniques can be used. However, the construction shown in FIG. 1 has been found to be ideally suitable for securing and fastening the discs to the hub assembly.

Hub 11 has an inner conical shaped surface 24 that is tapered to match the taper of spindle 5. The outer surface 25 of hub 11 is irregular shaped but has a conical shaped extension 27. As shown in FIG. 1 hub 11 covers almost the entire tapered section of spindle 5 and is merely slipped onto the spindle. No means are provided to secure hub 11 to spindle 5.

Upper disc pack 3 comprises three discs 9 and a hub 33. Discs 9 are secured to hub 33 by means of a nut and bolt 39 and clamps 35 and 37. This construction is similar to the clamp and nut and bolt construction of lower disc pack 1. The uppermost disc of disc pack 3 and the middle disc are held apart by means of a spacer 49 and the lowermost disc 9 and middle disc 9 are held apart by means of end portion 51 of the spoke 47 of hub 33. This structure too is essentially identical to the structure of lower disc pack 1. However, instead of having a pin secured therein, spoke 47 has a hole 43 that mates with pin 23 as shown in FIG. 1. A channel shaped member 41 is secured to hub 33. This channel shaped member mates with fastening means 31 to secure the upper disc pack 3 to spindle 5. The inner surface 53 of hub 33 is so configured that it slides over conical shaped part 27 of lower disc pack hub 11. In this manner lower disc pack 1 is held on spindle 5 when upper disc pack 3 is locked to spindle 5.

Summarizing the structure of FIG. 1, a lower disc pack 1 having a tapered inner hub surface 24 is slipped over a tapered spindle 5 and then an upper disc pack 3 having a tapered hub surface 53 is slipped over outside of the upper part of the lower disc pack hub. This upper portion of lower disc pack hub 11 is tapered to accommodate the taper of upper hub surface 53. The upper hub is then secured and locked to the spindle by securing means 31. The upper disc pack must be properly aligned so that a hole 43 provided in upper hub 33 engages pin 23 provided with lower hub 11. In order to facilitate alignment of the two hubs, symbols are provided on the uppermost disc 7 of lower disc pack 1 and the uppermost disc 9 of upper disc pack 3. This symbol may take the form of the arrow 57 shown in FIG. 4.

Figure 3:
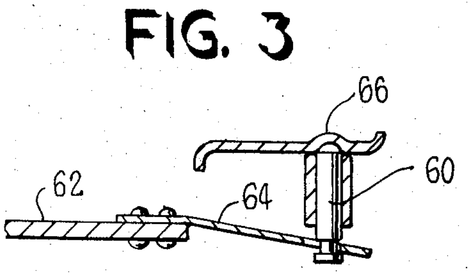
FIG. 3 is a detailed view of spring biased pins utilized to prevent tipping of the upper disc pack of this invention during the initial assembly of the upper disc pack onto the spindle.

During the initial installation of upper disc pack 3 onto spindle 5, the disc pack would normally tend to tip until pin 23 and hole 43 are mated. Tipping of upper disc pack 3 is prevented by means of a plurality of spring biased stabilizer pins 60, shown in FIGS. 3 and 4. FIG. 3 shows the structure of a single stabilizer pin assembly. Pin 60 is secured in one end of a flat spring 64 and the opposite end of spring 64 is secured to a section 62 of lower disc pack hub 11. Although not absolutely essential in the preferred embodiment, a track 66 is provided in hub 33 of upper disc pack 3 within which track pin 60 may ride.

Figure 4:
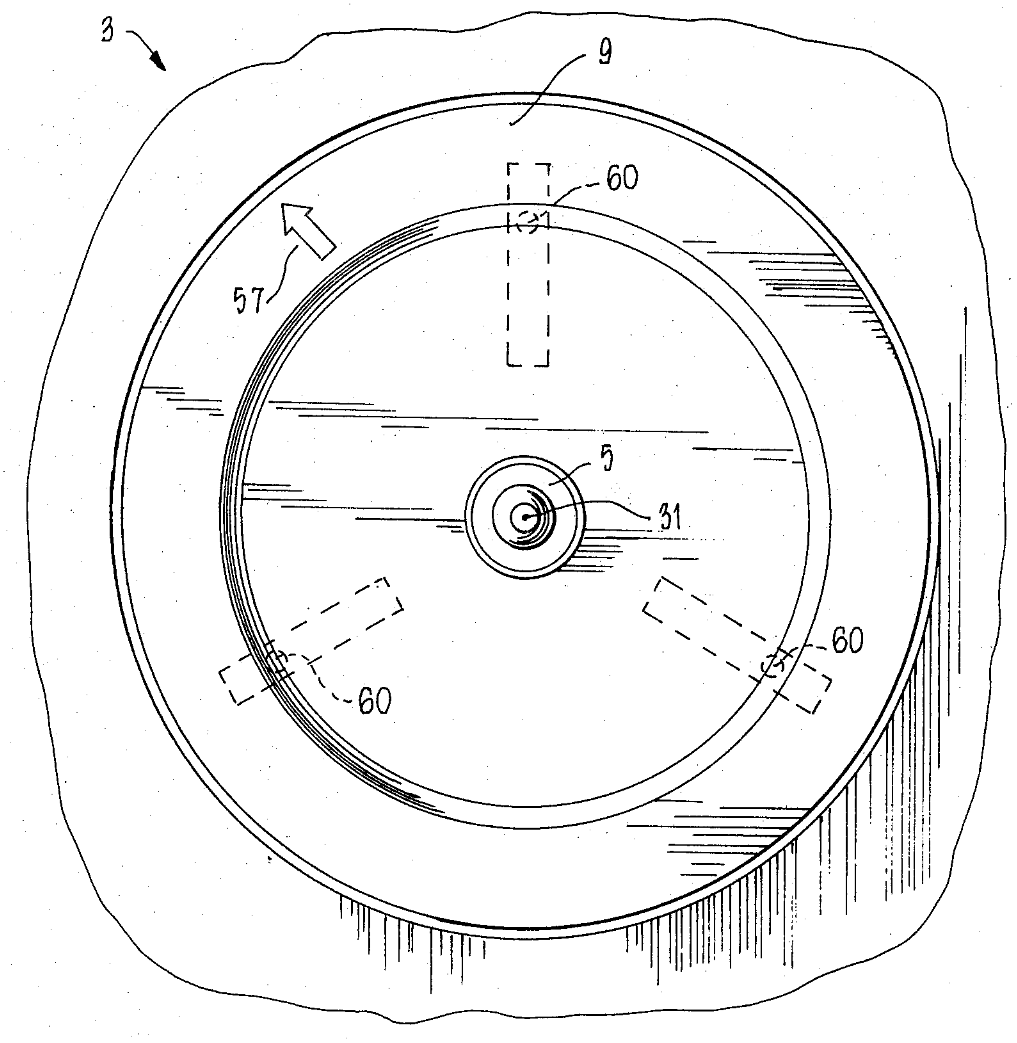
FIG. 4 is a plan view of an upper disc pack showing an alignment symbol and showing a suitable configuration of a plurality of the stabilizing pins of FIG. 3.

A typical manner in which a plurality of these pins 60 would be utilized is shown in FIG. 4. FIG. 4 shows these pins positioned equidistant from the center of spindle 5 but at different radial angles. When upper disc pack 3 is first placed on the spindle, pins 60 prevent tipping of the upper disc pack as is obvious from FIG. 4. Upper disc pack 3 is then turned until alignment arrow 57 is in line with the arrow or other symbol on the lower disc pack indicating that pin 23 and hole 43 are aligned. While the upper disc pack 3 is being turned to align it with the lower disc pack, pins 60 ride in track 66 and prevent tipping of the upper disc pack. Due to the position at which the cross section line was taken to show the disc pack assembly in FIGS. 1 and 2, pins 60 and the associated structure is not shown in these figures. However, FIGS. 3 and 4 clearly show the stabilizer assembly structure and the manner in which this structure performs its function.

Figure 5:
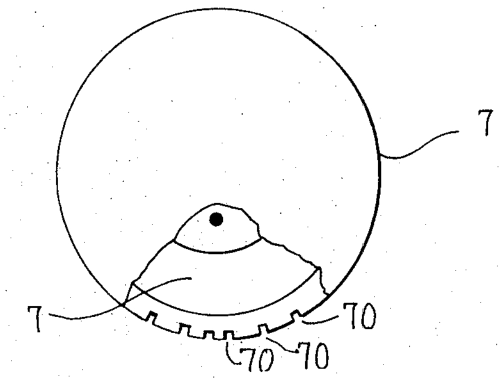
FIG. 5 illustrates typical information positioning notches that are generally provided with the lowermost disc of the lower disc pack of the twin disc pack assembly.

FIG. 5 shows the position notches 70 normally provided with the lowermost disc 7 of lower disc pack 1. These notches are used to provide position information so that information may be read into and extracted from the proper locations. In existing disc packs, these position notches are provided with each disc pack. With this invention, notches 70 need be provided with only the lower disc pack since the upper and lower disc packs relate in synchronism.

Figure 2:
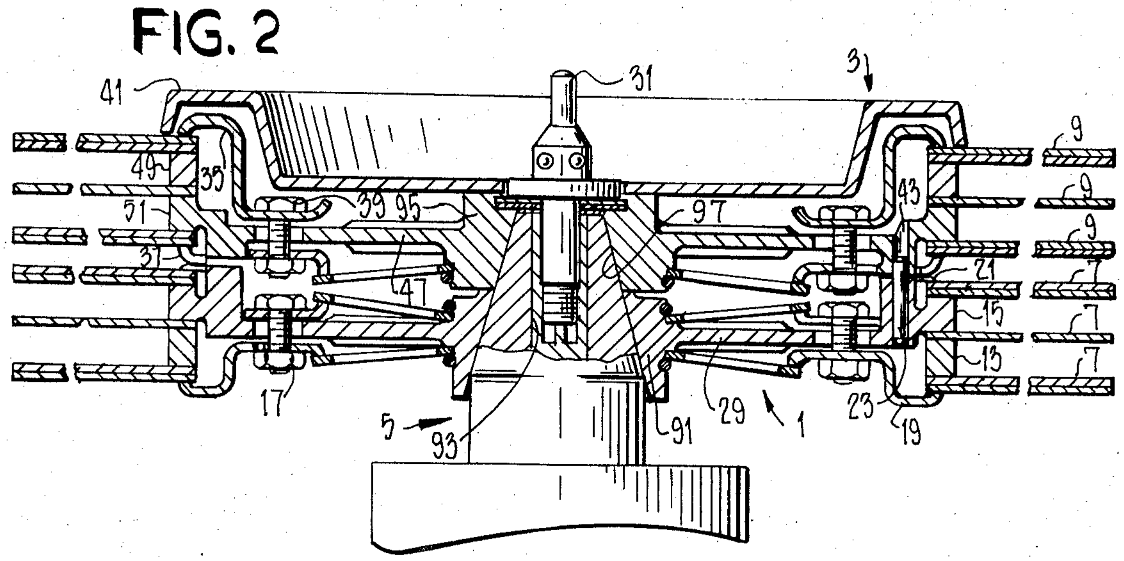
FIG. 2 shows a second embodiment of the twin disc pack assembly of this invention.

FIG. 2 shows a second embodiment of the invention. Again, a lower disc pack 1 and an upper disc pack 3 is provided. These disc packs are mounted on a spindle 5 and upper disc pack 3 is secured to spindle 5 by securing means 31. With exception of the structure of the hubs, the disc pack assembly of FIG. 2 is identical to the disc pack assembly of FIG. 1. Therefore, all reference numerals except the hub numerals are alike in the two Figures.

As shown in FIG. 2, lower disc pack 1 has a hub 91 having an inner conical surface 93 tapered to match the taper of spindle 5. Again, hub 91 merely slips onto spindle 5 and is not fastened thereto. Hub 91 does not have an upper conical projection equivalent to the conical projection 27 of hub 11 in FIG. 1. One could essentially fabricate hub 91 from hub 11 by cutting off the upper conical part 27 of hub 11. In all other respects hub 91 is essentially identical to hub 11.

Due to the shape of hub 91, the hub 33 of upper disc pack 3 of FIG. 1 cannot be used with the FIG. 2 embodiment. In FIG. 2 the hub 95 of upper disc pack 3 slips onto spindle 5 and rests on top of hub 91 instead of slipping over a part of the lower hub as is the case in the FIG. 1 embodiment. Therefore, hub 95 has a conical inner surface 97 tapered to match the taper of the upper part of spindle 5.

In all other respects, the assemblies of FIGS. 1 and 2 are identical. A drive pin 23 and mating hole 43 are provided in both embodiments, stabilizer pins 60 are used in both embodiments and indexing notches are provided in the lowermost disc of the lower disc pack of both assemblies.

From the foregoing description of the invention, it is obvious that this invention provides a highly versatile disc pack memory assembly. Two removable disc packs are provided on a common spindle instead of the single removable disc pack of the prior art assemblies.

While the invention has been described with reference to two specific embodiments, it will be obvious to those skilled in the art that various changes and modifications can be made to the embodiments disclosed without departing from the spirit and scope of the invention as set forth in the claims.

What is claimed is:

1. A twin disc pack assembly comprising:

a rotatable spindle;

a first disc pack;

means to removably mount said first disc pack onto said spindle;

a second disc pack;

means to removably mount said second disc pack onto said spindle above said first disc pack;

releasable means coupling said second disc pack to said first disc pack to insure synchronous rotation of said first and second disc pack and;

means to secure said second disc pack to said spindle.

2. A twin disc pack assembly as defined in claim 1 wherein said means to mount said first disc pack onto said spindle is a hub that forms a part of said first disc pack and said means to mount said second disc pack on said spindle is a hub that forms a part of said second disc pack.

3. A twin disc pack assembly as defined in claim 2 wherein said second disc pack hub surrounds a portion of said first disc pack hub when said first and second disc packs are mounted on said spindle.

4. A twin disc pack assembly as defined in claim 2 wherein said hub of said second disc pack abuts said hub of said first disc pack when said first and second disc packs are mounted on said spindle.

5. A twin disc pack assembly as defined in claim 2 wherein said first disc pack comprises a plurality of magnetic coated discs coaxially mounted on said first disc pack hub in a spaced apart relation and said second disc pack comprises a plurality of discs coaxially mounted on said second disc pack hub in a spaced apart relation.

6. A twin disc pack assembly as defined in claim 5 wherein the lowermost disc of said plurality of discs of said first disc pack is provided with a plurality of positioning notches.

7. A twin disc pack assembly as defined in claim 2 wherein said hub of said first disc pack includes a fixed drive pin and wherein said hub of said second disc pack includes a hole for mating with said drive pin of said first disc pack hub.

8. A twin disc pack assembly as defined in claim 7 wherein the uppermost discs of both said first and said second disc packs each include a symbol for aligning said drive pin with said hole.

9. A twin disc pack assembly as defined in claim 2 wherein said spindle is conical shaped.

10. A twin disc pack assembly as defined in claim 9 wherein in said first disc pack hub has a conical inner surface tapered to match said taper on the lower part of said conical spindle and said second disc pack hub has an inner conical surface tapered to match the taper of the upper part of said conical spindle.

11. A twin disc pack assembly as defined in claim 10 wherein said first disc pack hub has a fixed drive pin fabricated therein and said second disc pack hub has a hole fabricated therein for mating with said fixed drive pin.

12. A twin disc pack assembly as defined in claim 10 wherein said first disc pack hub has a plurality of stabilizing pins mounted thereon equidistant from the center of said first disc pack hub but at different radial angles and said second disc pack hub has a surface for mating with said stabilizing pins.

13. A twin disc pack assembly as defined in claim 9 wherein said first disc pack hub has an inner conical surface tapered to match the taper of said conical shaped spindle and has a conical shaped outer surface at the topmost part of said hub.

14. A twin disc pack assembly as set forth in claim 13 wherein said second disc pack hub has a conical inner surface tapered to fit over said outer conical shaped surface of said first disc pack hub.

15. A twin disc pack assembly as defined in claim 14 wherein said first disc pack hub has a plurality of stabilizing pins mounted thereon equidistant from the center of said first disc pack hub but at different radial angles and said second disc pack hub has a groove for mating with said stabilizing pins.

16. A twin disc pack assembly as defined in claim 14 wherein said first disc pack hub has a fixed drive pin fabricated therein and said second disc pack hub has a hole fabricated therein for mating with said fixed drive pin.

17. A twin disc pack assembly as defined in claim 1 wherein means are provided to prevent tipping of said second disc pack when said second disc pack is first mounted on said spindle.

18. A twin disc pack assembly as defined in claim 17 wherein said means to prevent tipping comprises a plurality of spring biased pins associated with said lower disc pack hub and a surface associated with said first disc pack hub, said surface mating with said spring biased pins.

19. A twin disc pack assembly adapted to be attached to the motor-driven rotatable spindle of a disc drive and which comprises:

- a first disc pack;
- means to removably mount said first disc pack onto the spindle of a disc drive;
- a second disc pack;
- means to removably mount said second disc pack onto said spindle above said first disc pack;
- means to releasably secure said second disc pack to said first disc pack to preclude relative movement therebetween and to provide synchronous rotation of said first and second disc pack;
- means to secure said second disc pack to said spindle.

20. A twin disc pack assembly as defined in claim 19 wherein said means to mount said first disc pack onto said spindle is a hub that forms a part of said first disc pack and said means to mount said second disc pack on said spindle is a hub that forms a part of said second disc pack.

21. A twin disc pack assembly as defined in claim 20 wherein said hub of said second disc pack abuts said hub of said first disc pack when said first and second disc packs are mounted on said spindle.

22. A twin disc pack assembly as defined in claim 19 wherein means carried by the first disc pack prevent tipping of said second disc pack when said second disc pack is first mounted on said spindle.

23. A twin disc pack assembly as defined in claim 22 wherein said means to prevent tipping comprises a plurality of spring biased pins associated with said lower disc pack hub and a surface associated with said first disc pack hub, said surface mating with said spring biased pins.

24. A twin disc pack assembly as defined in claim 20 wherein said first disc pack comprises a plurality of magnetic coated discs coaxially mounted on said first disc pack hub in a spaced apart relation and said second disc pack comprises a plurality of discs coaxially mounted on said second disc pack hub in a spaced apart relation.

25. A twin disc pack assembly as defined in claim 24 wherein the lowermost disc of said plurality of discs of said first disc pack is provided with a plurality of positioning notches.

26. A twin disc pack assembly as defined in claim 20 wherein said hub of said first disc pack includes a fixed drive pin and wherein said hub of said second disc pack includes a hole for mating with said drive pin of said first disc pack hub and for releasably securing the second disc pack to the first disc pack.

27. A twin disc pack assembly as defined in claim 26 wherein the uppermost discs of both said first and second disc packs each include a symbol for aligning said drive pin with said hole.

28. A twin disc pack assembly as defined in claim 20 wherein said spindle is conical shaped.

29. A twin disc pack assembly as defined in claim 23 wherein said first disc pack hub has a conical inner surface tapered to match said taper on the lower part of said conical spindle and said second disc pack hub has an inner conical surface tapered to match the taper of the upper part of said conical spindle.

30. A twin disc pack assembly as defined in claim 29 wherein said first disc pack hub has a fixed drive pin fabricated therein and said taper disc pack hub has a hole fabricated therein for mating with said fixed drive pin.

31. A twin disc pack assembly as defined in claim 28 wherein said first disc pack hub has an inner conical surface tapered to match the taper of said conical shaped spindle and has a conical shaped outer surface at the topmost part of said hub.

32. A twin disc pack assembly as set forth in claim 31 wherein said second disc pack hub has a conical inner surface tapered to fit over said outer conical shaped surface of said first disc pack hub.

33. A twin disc pack assembly as defined in claim 32 wherein said first disc pack hub has a fixed drive pin fabricated therein and said second disc pack hub has a hole fabricated therein for mating with said fixed drive pin.

34. A twin disc pack assembly as defined in claim 32 wherein said first disc pack hub has a plurality of stabilizing pins mounted thereon equidistant from the center of said first disc pack hub but at different radial angles.

35. A twin disc pack assembly as defined in claim 34 wherein said first disc pack hub has a plurality of stabilizing pins mounted thereon equidistant from the center of said first disc pack hub but at different radial angles and said second disc pack hub has a surface for mating with said stabilizing pins.

* * * * *